US012321979B2

United States Patent
Pronski et al.

(10) Patent No.: US 12,321,979 B2
(45) Date of Patent: *Jun. 3, 2025

(54) SYSTEM AND METHOD FOR OPTIMIZED TRANSFER OF DIGITAL ASSETS

(71) Applicant: The Toronto-Dominion Bank, Toronto (CA)

(72) Inventors: Michael Pronski, Toronto (CA); Darius Braziunas, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 118 days.

This patent is subject to a terminal disclaimer.

(21) Appl. No.: 18/163,519

(22) Filed: Feb. 2, 2023

(65) Prior Publication Data
US 2023/0196447 A1    Jun. 22, 2023

Related U.S. Application Data

(63) Continuation of application No. 17/148,980, filed on Jan. 14, 2021, now Pat. No. 11,599,934.

(51) Int. Cl.
G06Q 30/06    (2023.01)
G06Q 20/08    (2012.01)
G06Q 20/36    (2012.01)
G06Q 30/0601   (2023.01)

(52) U.S. Cl.
CPC ....... *G06Q 30/0637* (2013.01); *G06Q 20/085* (2013.01); *G06Q 20/3672* (2013.01); *G06Q 30/0641* (2013.01)

(58) Field of Classification Search
None
See application file for complete search history.

(56) References Cited

U.S. PATENT DOCUMENTS

| 6,240,397 | B1 | 5/2001  | Sachs        |
|-----------|----|---------|--------------|
| 6,360,254 | B1 | 3/2002  | Linden et al.|
| 7,627,484 | B2 | 12/2009 | Cohen et al. |
| 8,445,816 | B2 | 5/2013  | Cole         |

(Continued)

FOREIGN PATENT DOCUMENTS

EP    3284051    10/2016

OTHER PUBLICATIONS

Anon., "First Data Releases Additions to eGift SocialSM Marketplace," Close-Up Media, Inc. Dec. 23, 2010. (Year: 2010).*

(Continued)

*Primary Examiner* — Nicholas D Rosen
(74) *Attorney, Agent, or Firm* — Rowand LLP

(57) ABSTRACT

A computer-implemented method is disclosed. The method includes: generating a unique code for a recipient of a value storage token; sending, to a messaging address associated with the recipient, a first message including a link for accessing a token provider selection interface; detecting activation of the link by the recipient; in response to detecting activation of the link by the recipient, providing, on a computing device associated with the recipient, the token provider selection interface; receiving, via the token provider selection interface, a selection of a first token provider; and in response to receiving the selection of the first token provider, sending a digital representation of the value storage token to the messaging address associated with the recipient.

18 Claims, 7 Drawing Sheets

(56) References Cited

U.S. PATENT DOCUMENTS

| | | | |
|---|---|---|---|
| 9,436,942 | B2 | 9/2016 | White |
| 9,565,186 | B1 | 2/2017 | Miller et al. |
| 9,785,992 | B2 | 10/2017 | Glass et al. |
| 10,121,127 | B1 | 11/2018 | Isaacson et al. |
| 10,229,412 | B1 | 3/2019 | Henderson |
| 10,243,904 | B1 | 3/2019 | Wescoe et al. |
| 10,402,792 | B2 | 9/2019 | Lin et al. |
| 10,769,707 | B2 | 9/2020 | Erez et al. |
| 10,915,876 | B2 * | 2/2021 | Soriano .............. G06Q 20/3433 |
| 11,184,337 | B2 | 11/2021 | Hathaway et al. |
| 11,210,729 | B2 | 12/2021 | Stone et al. |
| 11,429,942 | B2 * | 8/2022 | Pronski ................ G06Q 20/327 |
| 11,599,934 | B2 * | 3/2023 | Pronski ................ G06Q 20/342 |
| 11,928,670 | B2 * | 3/2024 | Pronski ................ G06Q 20/349 |
| 2003/0050885 | A1 | 3/2003 | Cohen et al. |
| 2005/0165641 | A1 | 7/2005 | Chu et al. |
| 2011/0114611 | A1 | 5/2011 | Cole |
| 2011/0218907 | A1 | 9/2011 | Dessert et al. |
| 2012/0209748 | A1 | 8/2012 | Small |
| 2013/0211954 | A1 | 8/2013 | Linden et al. |
| 2013/0246209 | A1 | 9/2013 | White |
| 2013/0297493 | A1 | 11/2013 | Linden et al. |
| 2014/0122282 | A1 | 5/2014 | Orellana |
| 2014/0279282 | A1 | 9/2014 | Begg |
| 2014/0337182 | A1 | 11/2014 | Isaacson et al. |
| 2014/0372251 | A1 | 12/2014 | Rodell |
| 2015/0302493 | A1 | 10/2015 | Batstone et al. |
| 2015/0348167 | A1 | 12/2015 | McDermott |
| 2016/0239827 | A1 | 8/2016 | Reddy et al. |
| 2017/0046651 | A1 | 2/2017 | Lin et al. |
| 2017/0316491 | A1 | 11/2017 | Stone et al. |
| 2018/0053243 | A1 | 2/2018 | Schimke et al. |
| 2019/0073664 | A1 | 3/2019 | Scholzki |
| 2019/0197504 | A1 * | 6/2019 | Soriano ................ G06Q 20/204 |
| 2019/0392508 | A1 | 12/2019 | Glass et al. |
| 2021/0092102 | A1 | 3/2021 | Hathaway et al. |
| 2022/0222654 | A1 | 7/2022 | Pronski et al. |
| 2023/0252515 | A1 * | 8/2023 | Pronski .............. G06Q 30/0207 705/14.26 |
| 2023/0252516 | A1 * | 8/2023 | Ma ..................... G06Q 30/0201 705/14.26 |
| 2024/0185225 | A1 * | 6/2024 | Pronski ................ G06Q 20/349 |

OTHER PUBLICATIONS

Title: GiftRocket—How It Works; https://www.giftrocket.com/how-it-works.

* cited by examiner

SYSTEM AND METHOD FOR OPTIMIZED TRANSFER OF DIGITAL ASSETS

CROSS-REFERENCE TO RELATED APPLICATION

The present application is a continuation of U.S. patent application Ser. No. 17/148,980 filed on Jan. 14, 2021, the contents of which are herein incorporated by reference in their entirety.

TECHNICAL FIELD

The present disclosure relates to digital assets and, more particularly, to systems and methods for processing secure transfer of digital assets in a networked environment.

BACKGROUND

Digital assets or resources may be transferred between computing systems in a network. In some cases, a digital asset may be a token (e.g., a data object) that provides, or represents, a storage of value. By way of example, merchants may offer to customers digital gift cards, which may be loaded with value and subsequently redeemed for purchases from the merchants. Typically, a digital gift card is purchased and, after back-end processing completes, delivered to an intended recipient by way of a message (e.g., email). For example, an email containing a barcode that represents a digital gift card may be provided to a recipient. The barcode, when printed or displayed on a mobile device, may be scanned at a point-of-sale in order to make purchases using a value balance associated with the digital gift card.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF VARIOUS EMBODIMENTS

Figure 1:
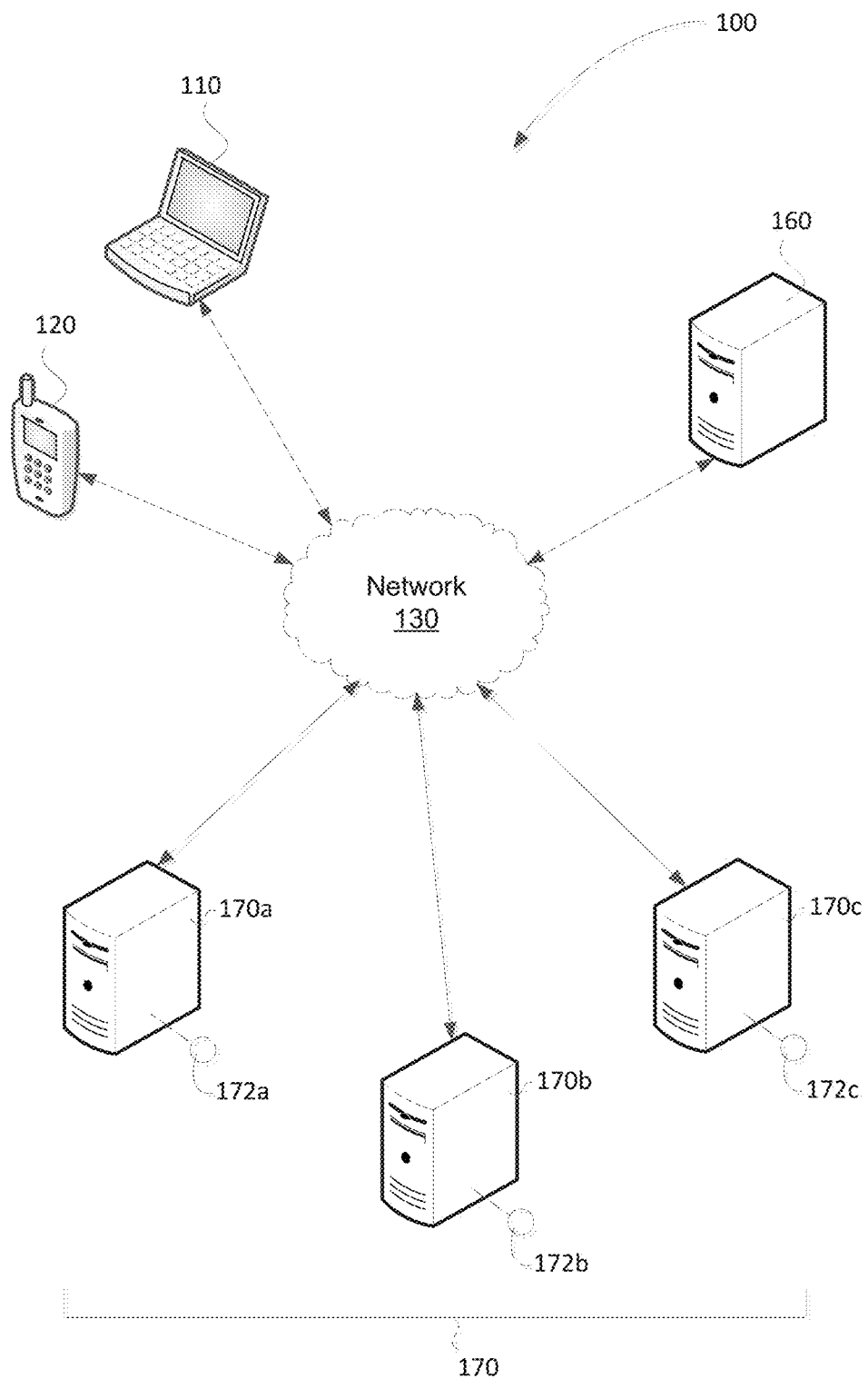
FIG. 1 is a schematic operation diagram illustrating an operating environment of an example embodiment.

In an aspect, a computing system is disclosed. The computing system includes a processor and a memory coupled to the processor. The memory stores computer-executable instructions, that when executed by the processor, configure the processor to: generate a unique code for a recipient of a value storage token; send, to a messaging address associated with the recipient, a first message including a link for accessing a token provider selection interface, the link associated with the unique code for the recipient; detect activation of the link by the recipient; in response to detecting activation of the link by the recipient, provide, on a computing device associated with the recipient, the token provider selection interface, wherein the providing includes presenting, via the token provider selection, a defined set of one or more supported token providers for the value storage token as selectable options; receive, via the token provider selection interface, a selection of a first token provider; and in response to receiving the selection of the first token provider, send a digital representation of the value storage token to the messaging address associated with the recipient.

In some implementations, the instructions, when executed, may further configure the processor to, in response to receiving the selection of the first token provider: obtain the digital representation of the value storage token associated with the order; process a transaction associated with an order for the value storage token.

In some implementations, the instructions, when executed, may further configure the processor to: establish a communication connection with a token provider server system associated with the first token provider through an application programming interface (API) for the first token provider, and obtaining the digital representation of the value storage token may include generating one or more API calls for requesting to obtain the digital representation.

In some implementations, the one or more API calls may define a requested denomination associated with the value storage token.

In some implementations, the link may have an associated expiry time and the token provider selection interface may be accessible via the link only before the expiry time.

In some implementations, processing the transaction associated with the order for the value storage token may include posting, to a customer account associated with a client device, a charge in connection with the order.

In some implementations, the digital representation of the value storage token may comprise a machine-readable code.

In some implementations, the digital representation of the value storage token may be included in a second message that is sent to the messaging address associated with the recipient, the second message including an indication of a sender of the value storage token.

In some implementations, the unique code may be generated responsive to receiving a request to process an order for the value storage token, the request indicating order parameters identifying one or more supported token providers in connection with the value storage token.

In some implementations, the digital representation of each of the value storage tokens may be delivered in real-time in response to detecting a transaction associated with the order.

In another aspect, a computer-implemented method is disclosed. The method includes: generating a unique code for a recipient of a value storage token; sending, to a messaging address associated with the recipient, a first message including a link for accessing a token provider selection interface, the link associated with the unique code for the recipient; detecting activation of the link by the recipient; in response to detecting activation of the link by the recipient, providing, on a computing device associated with the recipient, the token provider selection interface, wherein the providing includes presenting, via the token provider selection, a defined set of one or more supported token providers for the value storage token as selectable options; receiving, via the token provider selection interface, a selection of a first token provider; and in response to receiving the selection of the first token provider, sending a digital representation of the value storage token to the messaging address associated with the recipient.

In another aspect, a non-transitory computer readable storage medium is disclosed. The computer readable storage medium contains instructions thereon that, when executed by a processor, configure the processor to: generate a unique code for a recipient of a value storage token; send, to a messaging address associated with the recipient, a first message including a link for accessing a token provider selection interface, the link associated with the unique code for the recipient; detect activation of the link by the recipient; in response to detecting activation of the link by the recipient, provide, on a computing device associated with the recipient, the token provider selection interface, wherein the providing includes presenting, via the token provider selection, a defined set of one or more supported token providers for the value storage token as selectable options; receive, via the token provider selection interface, a selection of a first token provider; and in response to receiving the selection of the first token provider, send a digital representation of the value storage token to the messaging address associated with the recipient.

In another aspect, a computing system is disclosed. The computing system includes a processor, a communications module coupled to the processor, and a memory coupled to the processor. The memory stores instructions, that when executed by the processor, configure the processor to: receive, via a client device, a request to process an order of a value storage token, the request indicating order parameters identifying one or more supported token providers in connection with the value storage token and a messaging address associated with a recipient entity for the value storage token; send, to the messaging address associated with the recipient entity, a first message including a unique link for accessing a token provider selection interface; detect activation of the unique link by the recipient entity; in response to detecting activation of the unique link by the recipient entity, provide, on a computing device associated with the recipient entity, the token provider selection interface, wherein providing the token provider selection interface includes presenting only the one or more supported token providers as selectable options via the token provider selection interface; receive, via the token provider selection interface, a selection of a token provider; in response to receiving the selection of the token provider: obtain a digital representation of the value storage token associated with the order; process a transaction associated with the order of the value storage token; and send the digital representation of the value storage token to the messaging address associated with the recipient entity.

In some implementations, the instructions, when executed, may further configure the processor to: establish a communication connection with a token provider server system associated with the selected token provider through an application programming interface (API) for the selected token provider, and obtaining the digital representation of the value storage token associated with the order may include generating one or more API calls for requesting to obtain the digital representation of the value storage token.

In some implementations, the one or more API calls may define a requested denomination associated with the value storage token.

In some implementations, the instructions, when executed, further configure the processor to: generate a unique code for the recipient entity; and store, in the memory, the unique code in association with the messaging address associated with the recipient entity, and the unique link included in the first message may be associated with the unique code for the recipient entity.

In some implementations, the unique link may have an associated expiry time and the token provider selection interface may be accessible via the unique link only before the expiry time.

In some implementations, processing the transaction associated with the order of the value storage token may include posting, to a customer account associated with the client device, a charge in connection with the order.

In some implementations, the digital representation of the value storage token comprises a machine-readable code.

In some implementations, the order parameters define a denomination for the value storage token.

In some implementations, the digital representation of the value storage token may be included in a second message that is sent to the messaging address associated with the recipient entity, the second message including an indication of a sender of the value storage token.

In some implementations, the digital representation of the value storage token may be sent to the messaging address only in response to verifying that the transaction was successfully processed.

In another aspect, a computer-implemented method is disclosed. The method includes: receiving, via a client device, a request to process an order of a value storage token, the request indicating order parameters identifying one or more supported token providers in connection with the value storage token and a messaging address associated with a recipient entity for the value storage token; sending, to the messaging address associated with the recipient entity, a first message including a unique link for accessing a token provider selection interface; detecting activation of the unique link by the recipient entity; in response to detecting activation of the unique link by the recipient entity, providing, on a computing device associated with the recipient entity, the token provider selection interface, wherein providing the token provider selection interface includes presenting only the one or more supported token providers as selectable options via the token provider selection interface; receiving, via the token provider selection interface, a selection of a token provider; in response to receiving the selection of the token provider: obtaining a digital representation of the value storage token associated with the order; processing a transaction associated with the order of the value storage token; and sending the digital representation of the value storage token to the messaging address associated with the recipient entity.

In another aspect, a non-transitory computer readable storage medium is disclosed. The computer readable storage medium contains instructions thereon that, when executed by a processor, configure the processor to: receive, via a client device, a request to process an order of a value storage token, the request indicating order parameters identifying one or more supported token providers in connection with the value storage token and a messaging address associated with a recipient entity for the value storage token; send, to the messaging address associated with the recipient entity, a first message including a unique link for accessing a token provider selection interface; detect activation of the unique link by the recipient entity; in response to detecting activation of the unique link by the recipient entity, provide, on a computing device associated with the recipient entity, the token provider selection interface, wherein providing the token provider selection interface includes presenting only the one or more supported token providers as selectable options via the token provider selection interface; receive, via the token provider selection interface, a selection of a token provider; in response to receiving the selection of the token provider: obtain a digital representation of the value storage token associated with the order; process a transaction associated with the order of the value storage token; and send the digital representation of the value storage token to the messaging address associated with the recipient entity.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "digital asset" refers broadly to any object that is in a digital format and comes with a right to use. Digital assets may include, for example, token objects (e.g., value storage tokens), digital documents (e.g., word documents, emails), photographs, websites, audible content, digital wallets, cryptocurrencies, etc. and their respective metadata. A digital asset (and control thereof) may be transferred between computing systems in a network. For example, a token object may be embedded in a message that is transmitted from a sender computing system to one or more recipient computing systems. The digital asset may itself encode a transfer of control of the digital asset. In particular, a recipient entity may acquire control of data (e.g., stored value, etc.) associated with the digital asset upon receipt.

Digital assets can be created, modified, shared, destroyed, etc., among various possible operations. In particular, digital assets may be transferred between computing systems in a networked environment. By way of example, a digital asset can be transferred from a system that is responsible for its creation to one or more designated recipients. A fulfillment system may be configured to handle the processing of requests for transfer of digital assets and secure delivery of the requested digital assets. For example, an order fulfillment system may be configured for receiving, processing, and delivering orders of digital assets to end customers or their designated recipients. Various different types of digital assets (e.g., digital gift cards, etc.) may be handled by an order fulfillment system. Digital assets are often associated with stored values (e.g., gift card denominations), and an order fulfillment system may be configured to effect transfer of the associated stored values of the digital assets as well as control and/or access thereof.

Traditional systems for acquiring and/or transferring digital assets have various technical limitations. A single digital asset, such as a single gift card for an individual recipient, can easily be purchased and delivered from an interface associated with a merchant. A sender of the digital asset can create an order by defining various parameters (e.g., recipient's address, denomination, etc.) and requesting for the order to be delivered to the intended recipient. However, the process is not as simple or streamlined in the case of bulk orders for digital assets. The sender may either purchase multiple digital assets from one merchant or purchase from multiple different merchants. When purchasing from multiple merchants, the sender may be required to navigate to and use multiple independent interfaces for generating the orders, where each interface is associated with a respective merchant. This approach for bulk ordering can be time-consuming, increases the likelihood of errors in the orders, and lacks consistency in order handling. When digital assets are purchased from a single merchant (i.e., via the merchant's interface), the types of digital assets and capacity for customization of the digital assets may be limited. For example, while gift cards may be purchased in bulk from a single merchant, the merchant's interface may only allow minimal variance in the format and scope of the gift cards.

Transfer (or delivery) or digital assets presents further technical challenges for order fulfillment. When a digital asset is purchased and requested to be delivered, an order for the digital asset may be created, resulting in an allocation of resources in connection with the order. For example, if a sender creates an order for a digital gift card, the fulfillment system may allocate a digital gift card for the order and attempt to deliver it to the intended recipient. However, if the recipient does not claim the digital gift card (e.g., the recipient is not interested in the gift card, a message for accessing the gift card goes unread, etc.), it may never be used. The purchase transaction associated with the order may be processed prior to sending the gift card to the recipient, resulting in a charge against the sender's payment account, while the intended recipient of the gift card receives no benefit.

The present application provides systems and methods for fulfilling orders for digital assets that address some of the abovementioned technical limitations. In an aspect, a bulk digital asset fulfillment system is disclosed. The fulfillment system allows for bulk purchase of digital assets. More particularly, the fulfillment system represents a centralized hub on which multiple digital assets may be purchased. Upon receiving a request to process a bulk order for digital assets, such as value storage tokens (e.g., gift cards), the fulfillment system establish a communication connection with a server system associated with at least one digital asset provider through an application program interface (API) for the at least one digital asset provider. The fulfillment system generates API calls for requesting to obtain formatted representations of the digital assets associated with the order via the server system, and receives the digital assets for delivery to one or more designated recipients.

In another aspect, a system for optimizing digital asset fulfillment is described. The disclosed system optimizes resource allocations in connection with orders for digital assets. In accordance with disclosed embodiments, the system fulfills orders for digital assets only upon occurrence of one or more predetermined actions by the intended recipients of the digital assets. In particular, the system is configured to prompt the intended recipients to take certain actions in order to be eligible to claim the digital assets associated with the orders. By way of example, an order for one or more value storage tokens may be fulfilled only upon selection, by the intended recipients, of token providers that are to be associated with the value storage tokens. By requiring the prospective recipients to take action before fulfillment, the risk of "breakage" (e.g., expiry or sustained disuse) of digital assets that are ordered may be reduced, as those recipients that do not intend to use the digital asset are less likely to take action when prompted to do so by the system.

While the description below refers particularly to embodiments in the context of order fulfillment of value storage tokens (e.g., digital gift cards), it will be understood that the described embodiments are applicable more broadly for fulfillment of orders for various different types of digital assets and resources.

Reference is first made to FIG. 1, which is a schematic diagram illustrating an operating environment of an example embodiment. In particular, FIG. 1 illustrates exemplary components of a networked system 100 for generating, transmitting, processing, and otherwise fulfilling orders for digital assets.

As illustrated, a first client computing system 110 and a second client computing system 120 are in communication with a fulfillment server 160 via a network 130. The client computing systems 110, 120 are geographically remote from the fulfillment server 160 and vice versa. The client computing systems 110, 120 are also in communication with a set of token provider servers 170 via the network 130. For example, as illustrated, the client computing systems 110, 120 may be in communication with a first token provider server 170a, a second token provider server 170b, and a third token provider server 170c, all via the network 130. In at least some embodiments, each token provider server may be a computing system associated with a token provider, such as a merchant. For example, the token provider servers may be associated with merchants that offer digital assets, such as digital gift cards, for purchase.

Each of the client computing systems 110 and 120 may be a mobile computing device such as, for example, a laptop computer or smartphone as shown in FIG. 1. However, the client computing systems 110, 120 may be a computing device of another type such as, for example, a personal computer, a tablet computer, a hand-held computer, a personal digital assistant, a portable navigation device, a wearable computing device (e.g., a smart watch, a wearable activity tracker, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The first client computing system 110 may be associated with a sender entity. The sender entity is an entity that directly transfers or co-operates with one or more computing systems to effect a transfer of digital assets to specific recipients. For example, the sender entity may be a purchaser of one or more digital gift cards that are to be delivered to recipients identified by the sender entity. The sender entity may input instructions for the delivery of digital assets via the first client computing system 110. For example, the sender entity may place orders for digital gift cards using the first client computing system 110. The second client computing system 120 is associated with a recipient entity, or an entity that is an intended recipient of delivery of digital assets. The digital assets associated with an order by the sender entity may be transferred to and/or claimed using the second client computing system 120.

The fulfillment server 160 and each member of the set of token provider servers 170 is a computer server system. A computer server system may, for example, be a mainframe computer, a minicomputer, or the like. In some implementations, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, or the like.

The fulfillment server 160 enables purchases of digital assets, such as value storage tokens, in real-time and/or near real-time. Customers may communicate with the fulfillment server 160 to cause various digital assets to be purchased and/or reloaded, with those purchased digital assets and the loaded values (as the case may be) then becoming available for immediate or nearly-immediate use. For example, the first client computing system 110 may co-operate with the fulfillment server 160 via the network 130 to effect a purchase of digital gift cards for delivery to one or more recipients.

In at least some embodiments, the fulfillment server 160 is a platform on which digital assets of various different types may be purchased. By way of example, the fulfillment server 160 may co-operate with the set of token provider servers 170 to acquire value storage tokens (formatted or otherwise) from one or more token providers, and make those value storage tokens available for purchase by sender entities. The fulfillment server 160 may, for example, receive communications (i.e., orders) identifying digital gift cards to be acquired and may then identify a relevant member of the set of token provider servers 170 (e.g., one of the first token provider server 170a, the second token provider server 170b, or the third token provider server 170c) in order to effect purchase of those digital gift cards. Yet more particularly, to effect such purchases, the fulfillment server 160 may invoke one or more functions exposed by application programming interfaces (APIs) provided by a given member of the set of token provider servers 170. For example, as illustrated, each of the first token provider server 170a, the second token provider server 170b, and the third token provider server 170c provides a respective API, namely a first token provider API 172a, a second token provider API 172b, and a third token provider API 172c.

Additionally, or alternatively, the fulfillment server 160 may be a supplementary system that facilitates processing of orders for digital assets. In particular, the fulfillment server 160 may not itself provide interfaces for receiving orders, and may instead be an intermediary system that is interposed between order management interfaces and a plurality of digital asset (e.g., token) providers. The fulfillment server 160 facilitates transfer (or delivery) of purchased digital assets to their intended recipients. For example, the fulfillment server 160 may be configured to directly deliver digital assets to recipient computing systems or make the digital assets available for claiming, retrieval, etc. by recipient entities.

Figure 2A:
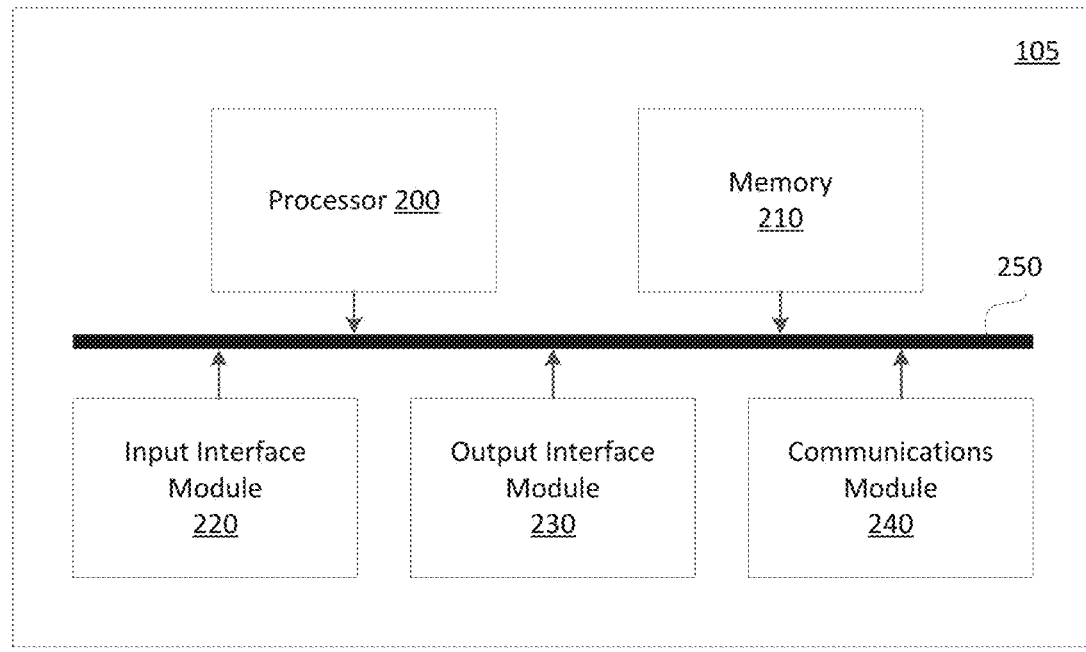
FIG. 2A is a high-level schematic diagram of an example computing device.

FIG. 2 is a high-level operation diagram of an example computing device 105. In some embodiments, the example computing device 105 may be exemplary of the first client computing system 110, the second client computing system 120, the fulfillment server 160, and/or one or more of the token provider servers 170*a-c*. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball, or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example, allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. The output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communication signals. Communication signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. The communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Alternatively, instructions may be executed by the processor 200 directly from read-only memory of memory 210.

Figure 2B:
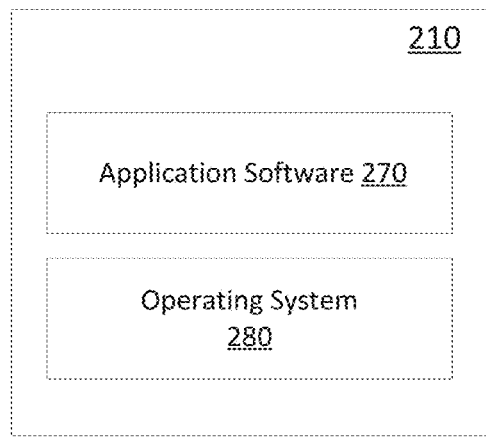
FIG. 2B is a schematic block diagram showing a simplified organization of software components stored in memory of the example computing device of FIG. 2A.

FIG. 2B depicts a simplified organization of software components stored in memory 210 of the example computing device 105. As illustrated, these software components include an operating system 280 and application software 270.

The operating system 280 is software. The operating system 280 allows the application software 270 to access the processor 200, the memory 210, the input interface module 220, the output interface module 230 and the communications module 240. The operating system 280 may be, for example, Apple iOS™, Google Android™, Linux™, Microsoft Windows™, or the like.

The application software 270 adapts the example computing device 105, in combination with the operating system 280, to operate as a device performing a particular function. The application software 270 may, for example, comprise a web browser application, a mobile wallet application, a banking application, and the like.

Figure 3:
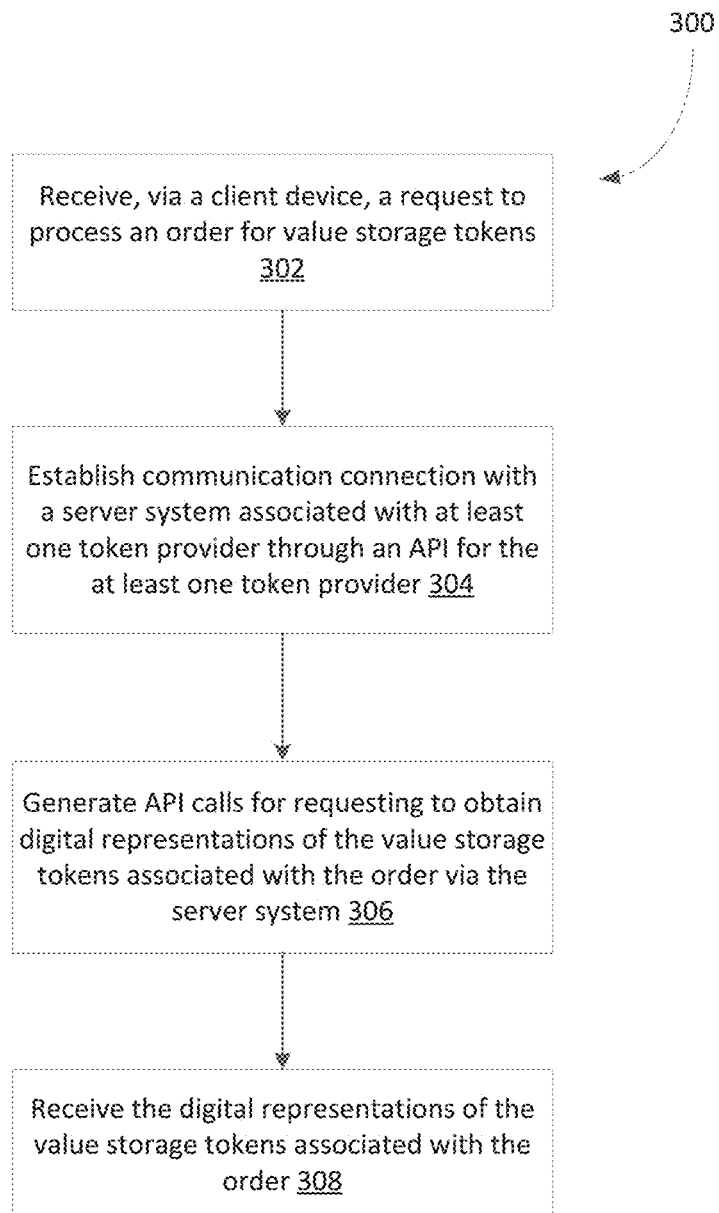
FIG. 3 shows, in flowchart form, an example method for processing bulk orders of digital assets.

Reference is now made to FIG. 3 which shows, in flowchart form, an example method 300 for processing bulk orders of digital assets. The method 300 may be performed by an order fulfillment system, such as the fulfillment server 160 of FIG. 1. For example, computer-executable instructions stored in memory of an order fulfillment server may, when executed by a processor of the server, configure the server to perform all or portions of method 300. The method 300 may be implemented as part of a process for transferring digital assets (and control and/or access thereof) between computing systems in a networked environment.

At operation 302, the server receives, via a client device, a request to process a bulk order for value storage tokens. The client device may, for example, be a computing device associated with a sender of the value storage tokens associated with the order. The request indicates at least one token provider (e.g., a merchant) and various order parameters associated with the order. The order parameters define at least one denomination and a quantity (i.e., greater than one) of value storage tokens to be associated with the at least one denomination. The at least one denomination may be a value that is inputted by the sender entity, or selected from a set of predefined values. The order parameters may indicate multiple denominations and respective quantities of value storage tokens that are desired to be purchased for those denominations. The request may additionally specify messaging addresses associated with one or more of the intended recipients of the value storage tokens. In particular, the request may indicate identifying information for the intended recipients of the purchased value storage tokens.

In at least some embodiments, the request may be a hypertext transfer protocol (HTTP) request, such as an HTTP GET. The request may be issued via a web browser operating on the client device. The web browser may, for example, receive a command through selection of a link or input of an address (such as a uniform resource locator) associated with an interface for an order fulfillment server and may, in response, send the request for the interface to the server. The request may, in other embodiments, be issued by an application other than a web browser. For example, a value transfer application, such as a personal banking application, operating on the client device may be configured to issue the request.

In some embodiments, the request to process the order may be received through a white-labelled user interface associated with the at least one token provider. For example, a token provider may wish to allow the purchase of value storage tokens (e.g., digital gift cards) without having to design and deploy such a dedicated system. Furthermore, where a token provider already has an online interface for supporting bulk purchases of physical gift cards, the disclosed order fulfillment system may integrate with the token provider's interface. The white-labelled user interface may be provided by the server and, more generally, a fulfillment system that manages orders for a plurality of token providers.

In some embodiments, the request to process the order may be received through an interface associated with a bulk fulfillment server, and the interface may be configured to prompt for user input of a selection from a set of value storage token types. For example, a user interface associated with a token provider's existing platform for order processing may prompt the sender entity to indicate whether the purchase is to be for a "physical" gift card or a "digital" gift card. If the sender entity indicates a selection of digital gift card, the order fulfillment system may be used for processing the order.

At operation 304, the server establishes a communication connection with a server system associated with the at least one token provider via a suitably identified application programming interface (API). A given token provider may have one or more associated APIs, with each API being designed to allow specific types of software interactions. The server identifies an API that can be used to initiate processing of a purchase of value storage tokens associated with the order. The API may be identified from amongst a set of candidate APIs that are known to the server as being associated with the selected at least one token provider.

In order to identify the API, the server may compare capabilities and/or properties of the candidate APIs to specific requirements, including the order parameters indicated in the request of operation 302. For example, the server may select an API based on the type of the value storage tokens that are required to be purchased using the identified API (e.g., a token type identified in the request). As another example, it may be that the particular nature of the intended purchase, such as the timing, quantity (e.g., bulk purchase of value storage tokens), etc., may be factored into identifying an API that is configured for handling such purchase. As yet another example, the APIs may be associated with certain restrictions, such as limits on value amounts of value storage tokens. In such cases, identifying an API may include comparing the requested value amounts of the value storage tokens, as specified in the order, against defined limits (on value) associated with the candidate APIs.

In some embodiments, the communication connection with the token provider server system may be established via the API prior to receiving the order parameters associated with the order for value storage tokens. That is, the server may be configured to interact with the at least one token provider server system via an associated API before receiving orders that are directed to the at least one token provider.

The identified API is then used to initiate bulk purchase of value storage tokens in accordance with the specified requirements of the order. For example, a purchase of a plurality of value storage tokens associated with the order and of value amounts indicated in the order may be initiated using the API. At operation 306, the server interacts with the identified API to obtain digital representations of the value storage tokens associated with the order via the token provider server system. In at least some embodiments, the server invokes one or more methods and/or function calls, or exchanges messages with the at least one token provider server via the API. The nature and manner such invocations, calls, and/or exchanges may vary depending on, for example, factors such as any messaging protocols employed, the particulars of the call structure of a given API, the need to authenticate, etc. For example, where the API identified at operation 304 utilizes a particular messaging protocol (e.g., SOAP or REST), using that API to initiate purchase of value storage tokens may include generating a message in conformity with that particular messaging protocol that can then be sent to the token provider computing system hosting that API.

At operation 308, the server receives digital representations of the value storage tokens associated with the order. A digital representation of a value storage token contains information, in a digital format, that allows for redeeming the value associated with the value storage token. For example, the digital representation may encode information such as value amount, identity of token provider, unique product identifier, and other metadata. In some embodiments, the digital representation of a value storage token may be in the format of a machine-readable code (e.g., QR code, barcode, etc.). The digital representations of the value storage tokens are received from the token provider server via the API identified at operation 304.

In some embodiments, the server may store, in a memory accessible by the server, the digital representations of the value storage tokens. For example, the digital representations of the value storage tokens may be stored in association with the order (and order parameters thereof) for later retrieval or delivery.

In at least some embodiments, the server may be configured to monitor distribution activity associated with the stored digital representations of the value storage tokens. That is, the server may include tracking features that a sender entity may use to track when a particular value storage token has been sent to a recipient. The server may, for example, allow a sender entity to purchase value storage tokens in bulk and to later retrieve and distribute them through the fulfillment server one-by-one and to track such retrievals and/or distributions.

Figure 4:
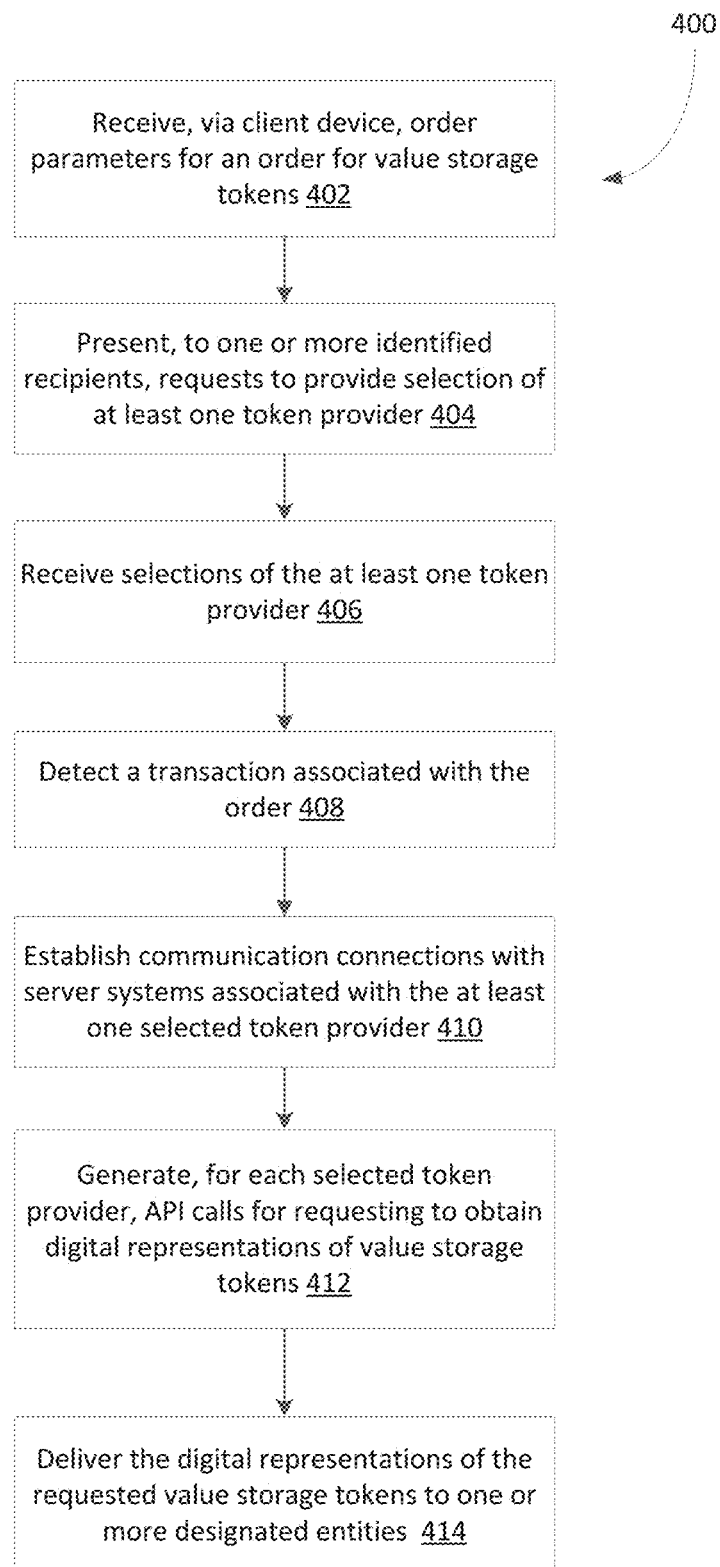
FIG. 4 shows, in flowchart form, another example method for processing bulk orders of digital assets.

Reference is now made to FIG. 4 which shows, in flowchart form, another example method 400 for processing bulk orders of digital assets. The method 400 may be performed by an order fulfillment system, such as the fulfillment server 160 of FIG. 1. For example, computer-executable instructions stored in memory of an order fulfillment server may, when executed by a processor of the server, configure the server to perform all or portions of method 400. The method 400 may be implemented as part of a process for transferring digital assets (and control and/or access thereof) between computing systems in a networked environment. The operations of method 400 may be performed in addition to, or as alternatives of, one or more of the operations of method 300.

At operation 402, the server receives a request to process a bulk order of value storage tokens. More particularly, the server receives, via a client device, order parameters for a bulk order. The order parameters may include, for example, at least one denomination, quantities of value storage tokens to purchase for each of the at least one denomination, and messaging addresses associated with one or more intended recipients.

At operation 404, the server presents, to one or more recipients identified in the order, requests to provide selection of at least one token provider. In at least some embodiments, the server may generate messages prompting the intended recipients to indicate a selection of a token provider, i.e., merchant. For example, the server may send messages (e.g., email) to the messaging addresses associated with the intended recipients, the messages requesting for each of the recipients to indicate one or more token providers for which a value storage token (e.g., digital gift card) is desired by the recipient. A message may, for example, contain a reference (e.g., hyperlink, URL) to a user interface of a connected document, such as a web page, for indicating a selection of one or more token providers. Alternatively, the selection interface may be displayed directly in a graphical user interface of an application that is operating on the client devices associated with the intended recipients.

At operation 406, the server receives user input of selections of the at least one token provider. In some embodiments, the request to process the bulk order of value storage tokens may identify a subset of supported token providers. That is, the sender entity may identify a set of one or more token providers that are desired to be supported, i.e., in association with the purchases of value storage tokens. The server may be configured to send, to the intended recipients of the value storage tokens, a request prompting for selection of at least one of the supported token providers in the subset defined by the sender entity, and receive, from the intended recipients, the selections of the at least supported token provider.

At operation 408, the server detects a transaction associated with the order. For example, the server may detect that a payment transaction has been initiated by the sender entity in connection with the bulk order of value storage tokens. The server may directly receive a request for processing a payment transaction associated with the order, or receive, from a payment processing system, an indication that a payment transaction has been initiated and/or completed in connection with the order.

At operation 410, the server establishes communication connections with server systems associated with the at least one selected token provider. For example, a communication connection may be established with a server system associated with each of the selected ones of the supported token providers. At operation 412, the server generates requests to obtain digital representations of value storage tokens via the APIs associated with the selected token providers. In particular, the server may invoke methods and/or function calls, or exchange messages via the APIs for obtaining the digital representations of value storage tokens. The operations 410 and 412 may be performed in a similar manner as operations 304 and 306 of method 300.

At operation 414, the server delivers the digital representations of the value storage tokens associated with the order to one or more designated entities. For example, the digital representations of the value storage tokens may be delivered to a sender entity and/or a plurality of recipient entities. In at least some embodiments, the digital representations of each of the value storage tokens are delivered in real-time or near real-time in response to detecting the transaction associated with the order.

In some embodiments, the digital representation may be delivered as a reply to an order processing request (i.e., request to process the bulk orders initiated by the sender entity). The reply could be considered a synchronous reply to the order processing request. For example, it may be considered a synchronous reply due to the low latency involved and/or because of the form of the request and the reply.

In some embodiments, the digital representation of the value storage token may be included in an email message. The message may include a link to allow metadata associated with the value storage token to be retrieved. The link may include, for example, a reference (e.g., hyperlink) that when clicked and otherwise selected will invoke an application as a handler and will serve to allow the application to be configured to allow use of the value storage token with the application.

In some embodiments, the server may be configured to generate deliverable products associated with the value storage tokens. For example, the server may obtain token provider-specific graphics data associated with the at least one token provider. As another example, the server may generate a document (e.g., a PDF file) that contains formatted representations of at least one of a plurality of the value storage tokens associated with the order. As yet another example, the server may generate a plurality of documents that contain formatted representations of the value storage tokens associated with the order. Each of the plurality of documents may, for example, correspond to a different denomination specified in the order parameters.

Figure 5:
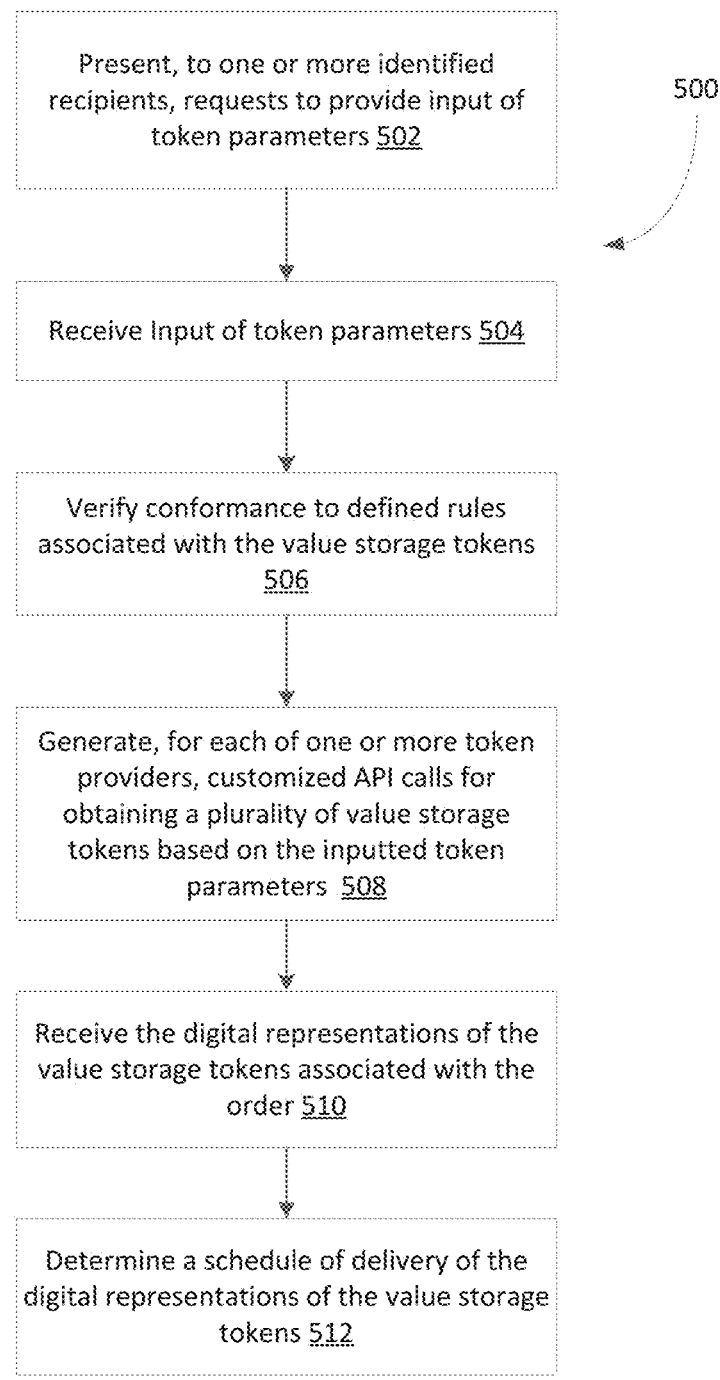
FIG. 5 shows, in flowchart form, an example method for processing customized orders of digital assets based on input from one or more intended recipients associated with the orders.

Reference is now made to FIG. 5 which shows, in flowchart form, an example method 500 for processing customized orders of digital assets. More particularly, the method 500 may be implemented for processing bulk orders of digital assets based on individualized input from one or more intended recipients associated with the orders. That is, a bulk order may be processed by fulfilling orders on an individualized basis for each of the one or more intended recipients. The method 500 may be performed by an order fulfillment system, such as the fulfillment server 160 of FIG. 1. For example, computer-executable instructions stored in memory of an order fulfillment server may, when executed by a processor of the server, configure the server to perform all or portions of method 500. The method 500 may be implemented as part of a process for transferring digital assets (and control and/or access thereof) between computing systems in a networked environment. The operations of method 500 may be performed in addition to, or as alternatives of, one or more of the operations of method 300 and method 400.

At operation 502, the server presents, to one or more identified recipients, requests to provide input of token parameters. Upon receiving a bulk order of value storage tokens from a sender entity, the server may generate requests to each of the intended recipients of the value storage tokens to specify parameters for customizing their value storage token. The sender entity may specify, as part of the request for processing the bulk order, various rules or limits to be imposed on the customized value storage tokens for the intended recipients. For example, the sender may indicate a maximum amount for each of one or more of the value storage tokens. That is, the sender may allow each recipient to customize their value storage token, insofar as they remain within the restrictions on the order parameters (e.g., denominations, set of supported token providers, redeemable time period, etc.) defined by the sender entity.

The server receives, from the intended recipients, input of token parameters, at operation 504. The input may be received via the client devices associated with the intended recipients. The inputted token parameters represent desired settings of the value storage tokens as indicated by the intended recipients. At operation 506, the server verifies conformance of each of the recipient-specified token parameters to the rules and/or limits defined by the sender entity. In particular, the server checks to ensure that the customized value storage tokens remain within the boundaries defined by the sender entity. If the token parameters provided by a recipient do not comply with the requirements specified by the sender entity, the recipient may be prompted to revise their inputted parameters or the value storage token associated with the recipient may cease to be processed.

By way of example, if the value amount specified by a recipient falls outside of the limits defined by the sender entity, the server may present a message to the recipient to notify that the inputted parameter is required to be revised and/or that the processing of the value storage token for the recipient is on hold until suitable changes are made to the parameter(s).

At operation 508, the server obtains the plurality of value storage tokens for the intended recipients via APIs associated with one or more token providers. In at least some embodiments, the server invokes methods and/or function calls, or exchanges messages with the token providers via their respective APIs. The methods/function calls may be invoked based, at least in part, on the token parameters inputted by the intended recipients.

At operation 510, the server receives, from the token providers via the APIs, the digital representations of the value storage tokens associated with the bulk order. At operation 512, the server determines a schedule of delivery of the digital representations of the value storage tokens. In particular, the schedule of delivery may identify the intended recipients, as specified by the sender entity, and the associated time and mode of delivery of the value storage tokens for each of the intended recipients. The timing of delivery may be determined on an individualized basis, for example, based on receipt of input of parameters from the intended recipients.

Figure 6:
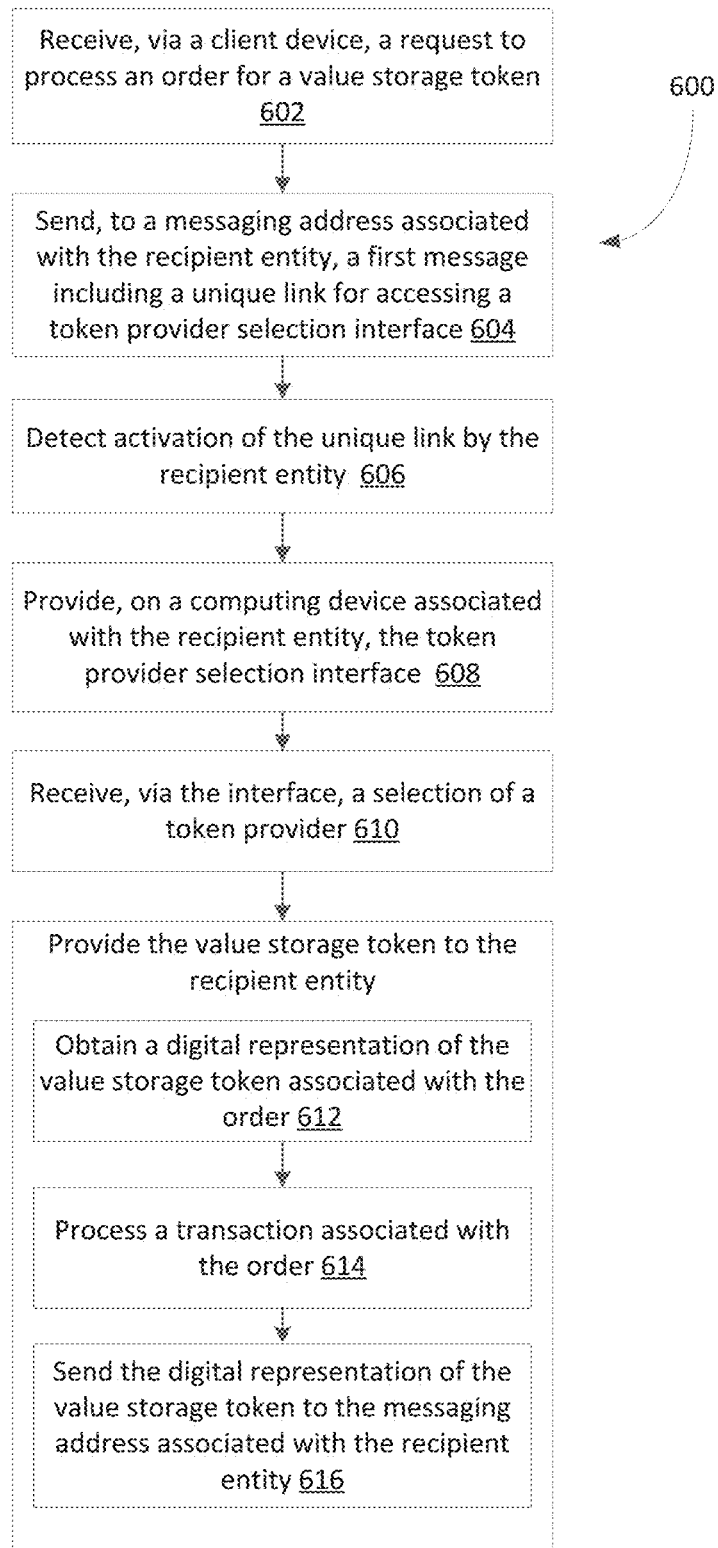
FIG. 6 shows, in flowchart form, an example method for managing access to digital assets.

Reference is now made to FIG. 6 which shows, in flowchart form, an example method 600 for managing access to digital assets. The method 600 may be performed by an order fulfillment system, such as the fulfillment server 160 of FIG. 1. For example, computer-executable instructions stored in memory of an order fulfillment server may, when executed by a processor of the server, configure the server to perform all or portions of method 600. The method 600 may be implemented as part of a process for transferring digital assets (and control and/or access thereof) between computing systems in a networked environment.

At operation 602, the server receives, via a client device, a request to process an order of a value storage token. The request indicates order parameters identifying one or more supported token providers in connection with the value storage token and a messaging address associated with a recipient entity for the value storage token. The order parameters may include, for example, a denomination (i.e., a value amount), a time of expiry, and the like.

At operation 604, the server sends, to the messaging address associated with the recipient entity, a first message including a unique link for accessing a token provider selection interface. In at least some embodiments, the server generates a unique code for the recipient entity. Different recipients may be associated with different codes such that, when the link is activated to allow the recipient to access a token provider selection interface, the fulfillment system is able to effectively identify the recipient and associate the selection with a particular recipient. The unique code may be stored in memory, in association with the messaging address for the recipient entity. The unique link included in the first message is associated with the unique code for the recipient entity.

The unique link may be time-limited. More particularly, the unique link may have an associated expiry time, and the token provider selection interface may be accessible via the unique link only before the expiry time.

At operation 606, the server detects activation of the unique link by the recipient entity. In response to detecting activation of the unique link by the recipient entity, the server provides, on a computing device associated with the recipient entity, the token provider selection interface, at operation 608. In at least some embodiments, the token provider selection interface presents all or a select number of token providers from which value storage tokens may be obtained. For example, the server may present only the one or more supported token providers as selectable options via the token provider selection interface. In some embodiments, the interface presented to the recipient entity may prompt for input of parameters in addition to, or as alternatives to, selection of a token provider. In particular, the server may provide a user interface that allows the recipient entity to input parameters (e.g., value amount, time of delivery, expiry date, product types, etc.) corresponding to their desired settings for the value storage token that they will receive.

At operation 610, the server receives, via the token provider selection interface, a selection (by the recipient) of a token provider. The server then provides the value storage token to the recipient entity. At operation 612, the server obtains a digital representation of the value storage token associated with the order. In at least some embodiments, the server establishes a communication connection with a token provider system associated with the selected token provider through an API for the selected token provider. The digital representation of the value storage token associated with the order is obtained via the APIs by, for example, invoking methods and/or function calls for retrieving the digital representation of the value storage token. For example, the server may invoke one or more API function calls based on a requested denomination associated with the value storage token.

At operation 614, the server processes a transaction associated with the order. The server may itself process a payment transaction associated with the order, or receive, from a payment processing system, an indication that a payment has been made in connection with the order. As a particular example, the server may post, to a customer account associated with the client device (i.e., sender entity) a charge in connection with the order.

At operation 616, the server sends the digital representation of the value storage token to the messaging address associated with the recipient entity. The digital representation of the value storage token may be included in a second message that is sent to the messaging address associated with the recipient entity. The second message may, for example, include an indication of a sender of the value storage token. The second message may only be sent to the messaging address for the recipient entity in response to verifying that the transaction (of operation 616) was successfully processed.

Figure 7:
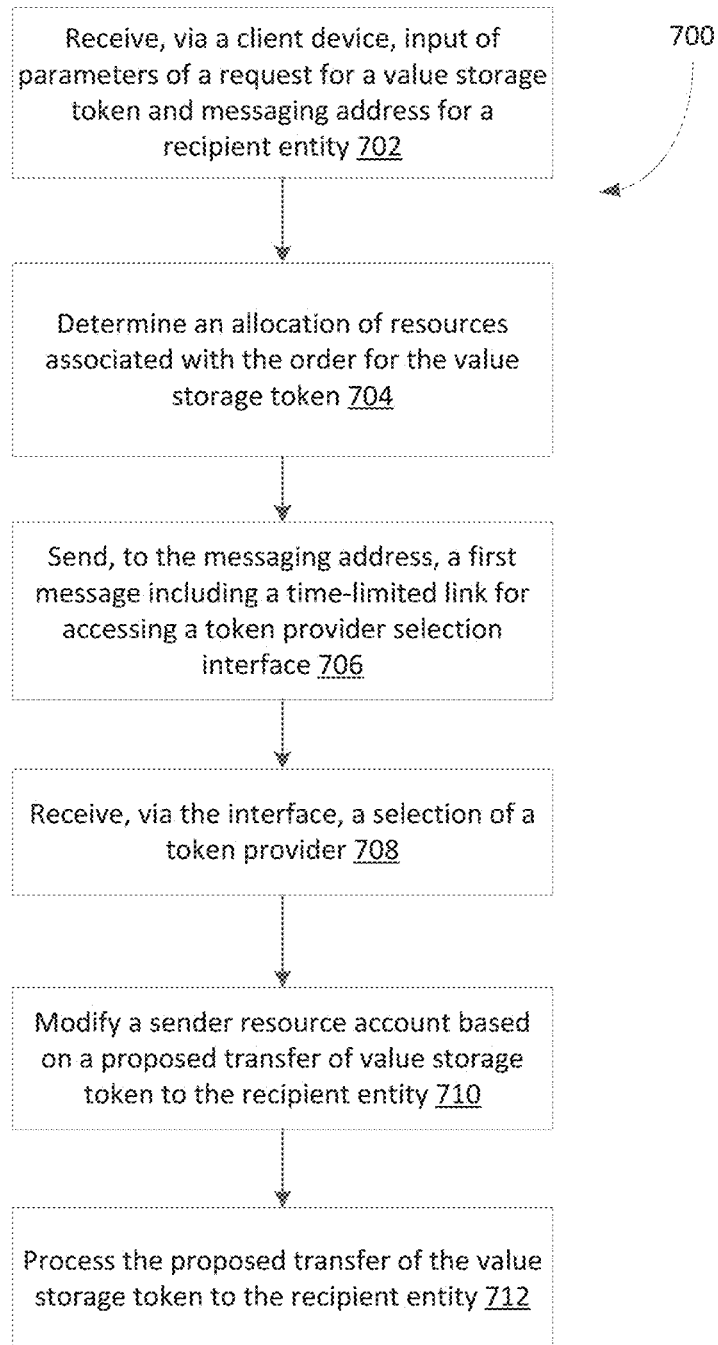
FIG. 7 shows, in flowchart form, another example method for managing access to digital assets.

Reference is now made to FIG. 7 which shows, in flowchart form, another example method 700 for managing access to digital assets. The method 700 may be performed by an order fulfillment system, such as the fulfillment server 160 of FIG. 1, in conjunction with one or more token provider servers. For example, computer-executable instructions stored in memory of an order fulfillment server may, when executed by a processor of the server, configure the server to perform all or portions of method 700. The method 700 may be implemented as part of a process for transferring digital assets (and control and/or access thereof) between computing systems in a networked environment. The operations of method 700 may be performed in addition to, or alternatives of, one or more of the operations of method 600.

At operation 702, the server receives, via a client device, input of parameters of a request (e.g., order) for a value storage token and a messaging address associated with a recipient entity. The parameters may be inputted, for example, by a sender entity, using their computing device, that desires to purchase a value storage token for the intended recipient. Operation 702 may be performed in a similar manner as operation 602 of method 600.

At operation 704, the server determines an allocation of resources associated with the order for the value storage token. An order fulfillment server may monitor, or have access to, tracking data associated with quantities of available value storage tokens for one or more supported token providers (i.e., token providers whose value storage tokens are supported on, or offered through, the order fulfillment server). The server may update the tracking data based on allocating an as-yet unclaimed/unused value storage token to the intended recipient. This conceptual allocation of a value storage token may be useful for the server when handling a large volume of requests for processing orders of value storage tokens that are of limited quantities. In particular, the server may determine the capacity (or expected capacity) of orders that it may handle from sender entities wishing to provide tokens to recipients via the order fulfillment server.

At operation 706, the server sends to the messaging address of the intended recipient, a first message including a time-limited link for accessing a token provider selection interface. The value storage token remains "allocated" for sending to the intended recipient but is not fulfilled until input is actually received from the recipient. The server then receives, via the interface, a selection of a token provider, at operation 708. In some embodiments, the server may receive additional (or alternative) parameters from the intended recipient of the value storage token via the interface.

At operation 710, the server modifies a sender resource account based on a proposed transfer of value storage token to the recipient entity. Upon receiving the selection of a token provider by the intended recipient, the server initiates processing of the order for the value storage token by, for example, posting a charge to a payment account associated with the sender entity. At operation 712, the server processes the proposed transfer of the value storage token to the recipient entity. The steps of obtaining the value storage token and delivering a formatted representation of the value storage token to the intended recipient may proceed in accordance with the embodiments described herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
a processor; and
a memory coupled to the processor, the memory storing computer-executable instructions that, when executed by the processor, configure the processor to:
generate a unique recipient-specific code for a recipient of a value storage token, wherein the unique code is generated responsive to receiving a request to process an order for the value storage token, the request indicating order parameters identifying one or more supported token providers in connection with the value storage token;
send, to a messaging address associated with the recipient, a first message including a link for accessing a token provider selection interface, the link associated with the unique code for the recipient;
detect activation of the link by the recipient;
in response to detecting activation of the link by the recipient, provide, on a computing device associated with the recipient, the token provider selection interface, wherein the providing includes presenting, via the token provider selection interface, a defined set of one or more supported token providers for the value storage token as selectable options;
receive, via the token provider selection interface, a selection of a first token provider; and
in response to receiving the selection of the first token provider, send a digital representation of the value storage token to the messaging address associated with the recipient.

2. The computing system of claim 1, wherein the instructions, when executed, further configure the processor to, in response to receiving the selection of the first token provider:
obtain the digital representation of the value storage token associated with the order; and
process a transaction associated with an order for the value storage token.

3. The computing system of claim 2, wherein the instructions, when executed, further configure the processor to:
establish a communication connection with a token provider server system associated with the first token provider through an application programming interface (API) for the first token provider,
wherein obtaining the digital representation of the value storage token comprises generating one or more API calls for requesting to obtain the digital representation.

4. The computing system of claim 3, wherein the one or more API calls define a requested denomination associated with the value storage token.

5. The computing system of claim 2, wherein processing the transaction associated with the order for the value storage token comprises posting, to a customer account associated with a client device, a charge in connection with the order.

6. The computing system of claim 2, wherein the digital representation of the value storage token comprises a machine-readable code.

7. The computing system of claim 2, wherein the digital representation of the value storage token is included in a second message that is sent to the messaging address associated with the recipient, the second message including an indication of a sender of the value storage token.

8. The computing system of claim 2, wherein the digital representation of the value storage token is sent to the messaging address only in response to verifying that the transaction was successfully processed.

9. The computing system of claim 1, wherein the link has an associated expiry time and wherein the token provider selection interface is accessible via the link only before the expiry time.

10. A computer-implemented method, comprising:
generating a unique recipient-specific code for a recipient of a value storage token, wherein the unique code is generated responsive to receiving a request to process an order for the value storage token, the request indicating order parameters identifying one or more supported token providers in connection with the value storage token;
sending, to a messaging address associated with the recipient, a first message including a link for accessing a token provider selection interface, the link associated with the unique code for the recipient;
detecting activation of the link by the recipient;
in response to detecting activation of the link by the recipient, providing, on a computing device associated with the recipient, the token provider selection interface, wherein the providing includes presenting, via the token provider selection interface, a defined set of one or more supported token providers for the value storage token as selectable options;
receiving, via the token provider selection interface, a selection of a first token provider; and
in response to receiving the selection of the first token provider, sending a digital representation of the value storage token to the messaging address associated with the recipient.

11. The method of claim 10, further comprising, in response to receiving the selection of the first token provider:
obtaining the digital representation of the value storage token associated with the order; and
processing a transaction associated with an order for the value storage token.

12. The method of claim 11, further comprising establishing a communication connection with a token provider server system associated with the first token provider through an application programming interface (API) for the first token provider, wherein obtaining the digital representation of the value storage token comprises generating one or more API calls for requesting to obtain the digital representation.

13. The method of claim 12, wherein the one or more API calls define a requested denomination associated with the value storage token.

14. The method of claim 11 wherein processing the transaction associated with the order for the value storage token comprises posting, to a customer account associated with a client device, a charge in connection with the order.

15. The method of claim 11, wherein the digital representation of the value storage token comprises a machine-readable code.

16. The method of claim 11, wherein the digital representation of the value storage token is included in a second message that is sent to the messaging address associated with the recipient, the second message including an indication of a sender of the value storage token.

17. The method of claim 11, wherein the digital representation of the value storage token is sent to the messaging address only in response to verifying that the transaction was successfully processed.

18. The method of claim 10, wherein the link has an associated expiry time and wherein the token provider selection interface is accessible via the link only before the expiry time.

* * * * *